March 19, 1963 CARL-ERIK GRANQVIST 3,082,385

TUNABLE HIGH FREQUENCY CIRCUIT OF WIDE FREQUENCY RANGE

Filed Oct. 1, 1958

INVENTOR
CARL-ERIK GRANQVIST

BY Larson & Taylor
ATTORNEYS

United States Patent Office 3,082,385

Patented Mar. 19, 1963

3,082,385
TUNABLE HIGH FREQUENCY CIRCUIT OF WIDE FREQUENCY RANGE

Carl-Erik Granqvist, Lidingo, Sweden, assignor to Svenska Aktiebolaget Gasaccumulator, Lidingo, Sweden, a corporation of Sweden Filed Oct. 1, 1958, Ser. No. 764,598
Claims priority, application Sweden Oct. 16, 1957
4 Claims. (Cl. 333—82)

The present invention refers to a tunable circuit for high frequencies, which covers relatively wide frequency range and has at the same time a high degree of selectivity.

At high frequencies it is not possible to use the conventional type of tunable circuit having a coil in parallel with a condenser because the capacitance values become so large that the high losses result in a low selectivity if the circuit is to cover a wide frequency range. Formerly, it was therefore customary to construct tunable circuits for high frequencies with rods, the length of which was variable by means of sliding contact devices, in case it was desired to have a wide frequency range. Sliding contacts are however difficult to construct from a mechanical point of view and do not have a reliable contact effect.

It is also possible to construct the tunable circuit with a variable series capacity, which is combined with a line of variable surge impedance. These series capacities are not very suitable for circuits in which an extremely high degree of stability is required and it is not possible to achieve in this manner extremely high values of selectivity. A series condenser circuit of this kind is very suitable as a transmitter tank circuit but it is less suitable as a receiver input circuit.

In accordance with the present invention, the tunable circuit comprises a linear conductor, which is rotatable on an axis parallel thereto, the conductor being divided into portions of different surge impedance. The difference in surge impedance between the various portions can be achieved by letting these portions assume in the course of the rotation of the conductor on the axis mutually different heights above a conductive plane.

The invention is described in the following with reference to the attached drawing, FIG. 1 of which shows a simple linear circuit and FIGS. 2–6 of which shows various embodiments of the tunable circuit according to the invention.

Figure 1:
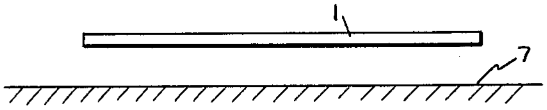

In FIG. 1 there is shown a linear circuit comprising a conductor placed above a conductive surface and the length of which is equal to one-half wave-length. As is well-known, such a circuit oscillates in such a way that a voltage maximum occurs at the ends of the line and a current maximum at the mid point thereof. The frequency does not change appreciably if the line is close to or far away from the conductive surface. Only the ratio between the current and voltage maximum will vary with the height above the surface.

Figure 2:
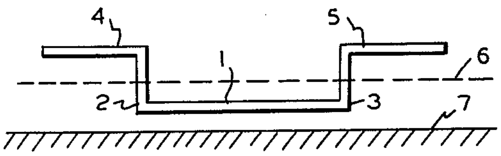

The FIG. 2 tunable circuit is constructed so as to comprise portions having mutually different heights above the conductive surface. The circuit is formed by an intermediate portion 1, which is connected through connection pieces 2 and 3 with the terminal portions 4 and 5. The portions 1, 4 and 5 are parallel to an axis 6 indicated by a dashline and on which the line is rotatable. The axis 6 is parallel to the conductive surface 7, so that the distance of the portions 1, 4 and 5 from this surface varies with rotation of the line on the axis 6.

To calculate the frequency range that can be covered with a tunable circuit according to FIG. 2, let $Z_{02}$ designate the surge impedance of the portions 4 and 5 of the conductor farther away from the ground surface and $Z_{01}$ the surge impedance for the portion of the conductor close to the surface. Further, $\alpha_1$ will denote the electrical length of the line portions for the case that the portion 1 of the conductor is closest to the conductive surface. Resonance occurs when the reactance as viewed from the midpoint towards the ends is zero, so that the following condition for resonance is obtained:

$$0=\frac{\dfrac{Z_{02}}{j\cdot\tan\alpha_1}+j\cdot Z_{01}\cdot\tan\alpha_1}{Z_{01}+Z_{02}}$$

This yields $$\tan^2\alpha_1=\frac{Z_{02}}{Z_{01}}$$

If the line is rotated 180° on the axis 6, the electrical length of the line portions will be $\alpha_2$, corresponding to a lower resonance frequency. We have then $$\tan^2\alpha_2=\frac{Z_{01}}{Z_{02}}$$

The frequency range covered by the arrangement according to FIG. 2 will be determined by the ratio $$\frac{\tan\alpha_2}{\tan\alpha_1}=\frac{Z_{02}}{Z_{01}}$$

For a line above a conductive surface, the surge impedance can be computed with comparatively good accuracy from the formula $$Z_0=138\cdot 10_{\log}\frac{4\cdot h}{d}$$

where $h$ denotes the height of the line portion above the conductive surface and $d$ the diameter of the line portion. We then have the following expression for the frequency range X $$X=\frac{\tan\alpha_2}{\tan\alpha_1}=\frac{10_{\log}\dfrac{4\cdot h_2}{d}}{10_{\log}\dfrac{4\cdot h_1}{d}}$$

If the tunable circuit is built, for instance of a tube of 10 mm. diameter, for which the smallest and the largest height above the conductive surface is 10 mm. and 50 mm., respectively, the frequency range ratio X will be approximately 2.18.

Figure 3:
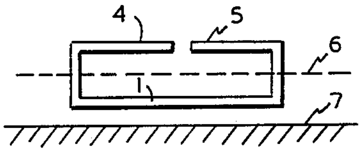

In order to reduce the length of the circuit, which in the embodiment according to FIG. 2 becomes comparatively large, the terminal portions 4 and 5 can be folded back towards each other, so that we obtain a rectangular loop open to one side. FIG. 3 shows such an embodiment of the circuit.

Figure 4:
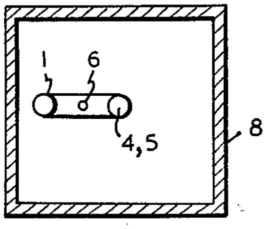

To prevent free radiation of energy from the circuit, a shield must be provided, and for this purpose the circuit can be placed in a shielding box 8 as shown in FIG. 4. The axis 6 on which the line rotates is then placed eccentrically with regard to the midline of the box 8, whereby the desired variation in surge impedance is obtained upon rotation of the line. The shielding box 8 does obviously not have to be rectangular, it being possible to shape the walls in such a way that the frequency variations are approximately linear. Also, by letting one wall be formed by a plate adjustable by means of screws, a facility for desired trimming of the frequency variation upon rotation is provided.

To supply energy to the circuit, one might provide an inductive coupling by means of a loop, but it is difficult to achieve a suitable degree of coupling over the entire frequency range when the whole line rotates. It would also be possible to provide capacitive coupling along the transverse portions of the line, which might, for instance, be formed by a low-inductance round discs. The preferred method, however, is to achieve coupling by means of a divided conductive surface.

Figure 5:
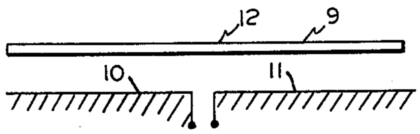

FIG. 5 shows in principle how such coupling may be achieved. According to the figure, a dipole 9 is placed above a conductive surface comprising portions 10 and 11. At the point 12, which is the centre of the dipole, the reactance is zero, and since the return current flows in the conductive surface it follows that the reactance between the portions 10 and 11 thereof is also zero. Stated otherwise, this implies that when the line has a length adapted to the resonance frequency, the reactance between the two portions of the conductive surface is zero.

Figure 6:
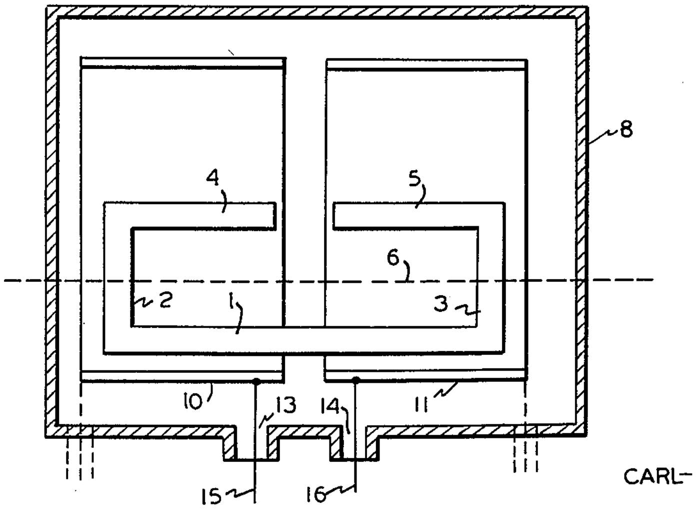

FIG. 6 shows how the energy supplied to the tunable circuit can be achieved by means of a divided conductive surface, the circuit being enclosed in a shielding box to prevent radiation of energy. The tunable circuit comprises the portions 1 to 5 and is rotatable in the manner already described on the axis 6, so that the portions 1, 4 and 5, in the course of the rotation, are brought nearer to or are removed from the portions 10 and 11 of the conductive surface. The arrangement is enclosed in a shielding box 8, which is provided with apertures 13 and 14 for feeder lines 15 and 16 connected each to one of the portions 10 and 11 of the conductive surface. The input side as well as the output side impedance will be shunted in this embodiment by the capacitance present between the shielding box 8 and the portions 10 and 11 of the conductive surface. By adjusting this capacitance to a suitable value, it is possible to choose the resistance that is transformed into the resonant circuit to obtain a suitable degree of loading. If too much resistance is transformed into the resonant circuit, the result will be that the selectivity is bad but the transmission good. As a rule, the capacitance should be chosen so that the resistance transformed into the circuit lowers the Q thereof by about one-half. Furthermore, if the output side and input side impedances differ, it is easy to arrange for equal matching in spite of this by increasing the diameter of the shielding box 8 over the part thereof surrounding the portion of the conductive surface having the higher impedance connected thereto. The impedance coupling can also be provided at the outer ends of the conductive surface, as indicated by dash lines in FIG. 6. This places a certain amount of reactance in series with the shunt capacitance referred to.

What I claim is:

1. A tunable circuit for high frequencies comprising a conductor mounted upon an axis of rotation, said conductor having two lines of substantially equal length in alignment on one side of said axis and parallel thereto and a single line on the opposite side of said axis and parallel thereto and having a length longer than the sum of the lengths of said two lines of substantially equal length, end portions connecting remote ends of each of said lines of equal length to adjacent ends of said single line, and a plurality of conductive surfaces parallel to said axis of rotation and adjacent to said conductor, said conductor mounted eccentrically with respect to said plurality of conductive surfaces.

2. A tunable circuit according to claim 1, wherein said conductor is a rectangular loop open on one side, said open side being formed by said two lines of equal length.

3. A tunable circuit according to claim 1, wherein said conductive surfaces are equal in size and two in number, each cooperating with one of said lines of equal length.

4. A tunable circuit according to claim 3, wherein each of said conductive surfaces is connected to a coupling conductor.

References Cited in the file of this patent

UNITED STATES PATENTS

| | | |
|---|---|---|
| 2,153,205 | Park | Apr. 4, 1939 |
| 2,540,137 | Page | Feb. 6, 1951 |
| 2,560,685 | Cooper | July 17, 1951 |
| 2,630,488 | Clogston | Mar. 3, 1953 |
| 2,727,148 | Slate | Dec. 13, 1955 |